(12) United States Patent
Jang et al.

(10) Patent No.: US 12,208,847 B2
(45) Date of Patent: Jan. 28, 2025

(54) PARKING SYSTEM AND PARKING CONTROL METHOD OF PERSONAL MOBILITY

(71) Applicants: HYUNDAI MOTOR COMPANY, Seoul (KR); KIA CORPORATION, Seoul (KR)

(72) Inventors: Yocheol Jang, Suwon-si (KR); Donghee Seok, Suwon-si (KR); Duck Young Kim, Seongnam-si (KR); Ilsun Song, Seongnam-si (KR); Hee Jin Ro, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 898 days.

(21) Appl. No.: 17/347,955

(22) Filed: Jun. 15, 2021

(65) Prior Publication Data
US 2022/0144360 A1      May 12, 2022

(30) Foreign Application Priority Data
Nov. 12, 2020   (KR) .......................... 10-2020-0150987

(51) Int. Cl.
*B62H 1/02* (2006.01)
*B62J 45/41* (2020.01)

(52) U.S. Cl.
CPC ................ *B62H 1/02* (2013.01); *B62J 45/41* (2020.02)

(58) Field of Classification Search
CPC ....................................................... B62H 1/02
See application file for complete search history.

(56) References Cited

U.S. PATENT DOCUMENTS

2005/0236805 A1 * 10/2005 Chen ........................ B62H 1/04
280/293

FOREIGN PATENT DOCUMENTS

| DE | 102017213875 A1 | * | 2/2019 | |
| GB | 2545014 A | * | 6/2017 | .............. B62H 1/02 |
| WO | WO-2019215474 A1 | * | 11/2019 | .............. B62H 1/04 |

* cited by examiner

*Primary Examiner* — Anne Marie M Boehler
*Assistant Examiner* — Hosam Shabara
(74) *Attorney, Agent, or Firm* — MCDONNELL BOEHNEN HULBERT & BERGHOFF LLP

(57) ABSTRACT

Disclosed are a parking system and a parking control method of a personal mobility. The parking system of the personal mobility includes a first parking stand and a second parking stand having one end rotatably installed at a lower end of a main body of the personal mobility and configured to be rotated downward to be unfolded to opposite sides of the main body or rotated upward to be folded, a parking motor configured to operate the first and second parking stands, and a power transmission device configured to transmit a rotational force of the parking motor to shafts of the first and second parking stands to simultaneously rotate the first and second parking stands in opposite directions.

12 Claims, 11 Drawing Sheets

PARKING SYSTEM AND PARKING CONTROL METHOD OF PERSONAL MOBILITY

CROSS REFERENCE TO RELATED APPLICATIONS

This application is based on and claims priority under 35 U.S.C. § 119 to Korean Patent Application No. 10-2020-0150987, filed on Nov. 12, 2020, in the Korean Intellectual Property Office, the disclosure of which is incorporated by reference herein in its entirety.

BACKGROUND

1. Field

The disclosure relates to relates to a parking system and a parking control method of a personal mobility capable of stably support a main body while a parking stand is automatically unfolded or folded.

2. Description of the Related Art

As used throughout this patent, the phrase "personal mobility" is intended to mean any moving personal vehicle, device, machine, instrument, apparatus, or the like. Recently, the use of a personal mobility such as an electric kickboard, an electric wheel, and an electric bicycle is expanding. The personal mobility may drive on roadways, sidewalks, narrow alleys, and the like by electric power, and may be used as a means of transportation or leisure for moving a short distance.

This personal mobility is provided with a parking stand to put the personal mobility in a standing state after use. A user may unfold the parking stand when parking the personal mobility and fold the parking stand when driving.

However, the use of a typical personal mobility is cumbersome because the user needs to manually operate the parking stand. In addition, because the parking stand located on one side supports a main body in a slightly inclined state, there is a limit to maintaining a stable parking state of the personal mobility. In particular, when parked in an irregular surface, the personal mobility may easily fall down.

SUMMARY

It is an aspect of the disclosure to provide a parking system and a parking control method of a personal mobility capable of stably support a main body while a parking stand is automatically unfolded or folded.

It is another aspect of the disclosure to provide a parking system and a parking control method of a personal mobility capable of adjusting an unfolding degree of a parking stand depending on a parking place.

Additional aspects of the disclosure will be set forth in part in the description which follows and, in part, will be obvious from the description, or may be learned by practice of the disclosure.

In accordance with an aspect of the disclosure, a parking system of a personal mobility includes a first parking stand and a second parking stand having one end rotatably installed at a lower end of a main body of the personal mobility and configured to be rotated downward to be unfolded to opposite sides of the main body or rotated upward to be folded, a parking motor configured to operate the first and second parking stands, and a power transmission device configured to transmit a rotational force of the parking motor to shafts of the first and second parking stands to simultaneously rotate the first and second parking stands in opposite directions.

The parking system may further include an operation unit configured to command an unfolding operation and a folding operation of the first and second parking stands, and a controller configured to control an operation of the parking motor based on a signal from the operation unit.

The operation unit may be configured to select an unfolding degree of the first and second parking stands.

The parking system may further include an operation unit configured to command an unfolding operation and a folding operation of the first and second parking stands, one or more ground contact sensors configured to detect whether the first or second parking stand comes into contact with the ground, and a controller configured to control an operation of the parking motor based on signals from the operation unit and the ground contact sensors.

The controller may control the parking motor to stop unfolding of the first and second parking stands when it is determined that the ground contact sensors come into contact with the ground.

The power transmission device may include a first driven bevel gear coupled to the shaft of the first parking stand, a second driven bevel gear coupled to the shaft of the second parking stand, and a driving bevel gear having opposite sides engaged with the first and second driven bevel gears, respectively, and coupled to a shaft of the parking motor.

The power transmission device may further include a gearbox configured to accommodate the first and second driven bevel gears and the driving bevel gear and fixed to the main body.

The first driven bevel gear and the second driven bevel gear may spaced apart from each other in a state in which shaft lines thereof coincide with each other, and the driving bevel gear may be arranged such that a shaft line thereof crosses the shaft lines of the first and second driven bevel gears.

The power transmission device may include a driving gear coupled to a shaft of the parking motor together with the first parking stand, and a driven gear coupled to the shaft of the second parking stand arranged parallel to the shaft of the parking motor and engaged with the driving gear.

The power transmission device may further include a gearbox configured to accommodate the driving gear and the driven gear and fixed to the main body.

In accordance with another aspect of the disclosure, a parking control method of a personal mobility, which includes one or more parking stands having one end rotatably installed at the personal mobility and configured to be rotated downward to be unfolded or reversely rotated to be folded, and a parking motor configured to operate the parking stands, includes determining whether an unfolding angle of the parking stands is selected and whether an unfolding signal of the parking stands is generated, and controlling the parking stands to be unfolded at the selected unfolding angle when it is determined that the unfolding angle is selected and the unfolding signal is generated.

In accordance with another aspect of the disclosure, a parking control method of a personal mobility, which includes one or more parking stands having one end rotatably installed at the personal mobility and configured to be rotated downward to be unfolded or reversely rotated to be folded, a parking motor configured to operate the parking stands, and one or more ground contact sensors configured to detect whether the parking stand comes into contact with the ground, includes determining whether an unfolding signal of the parking stands is generated, and controlling the parking stands to be unfolded until the ground contact sensors come into contact with the ground when it is determined that the unfolding signal is generated.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
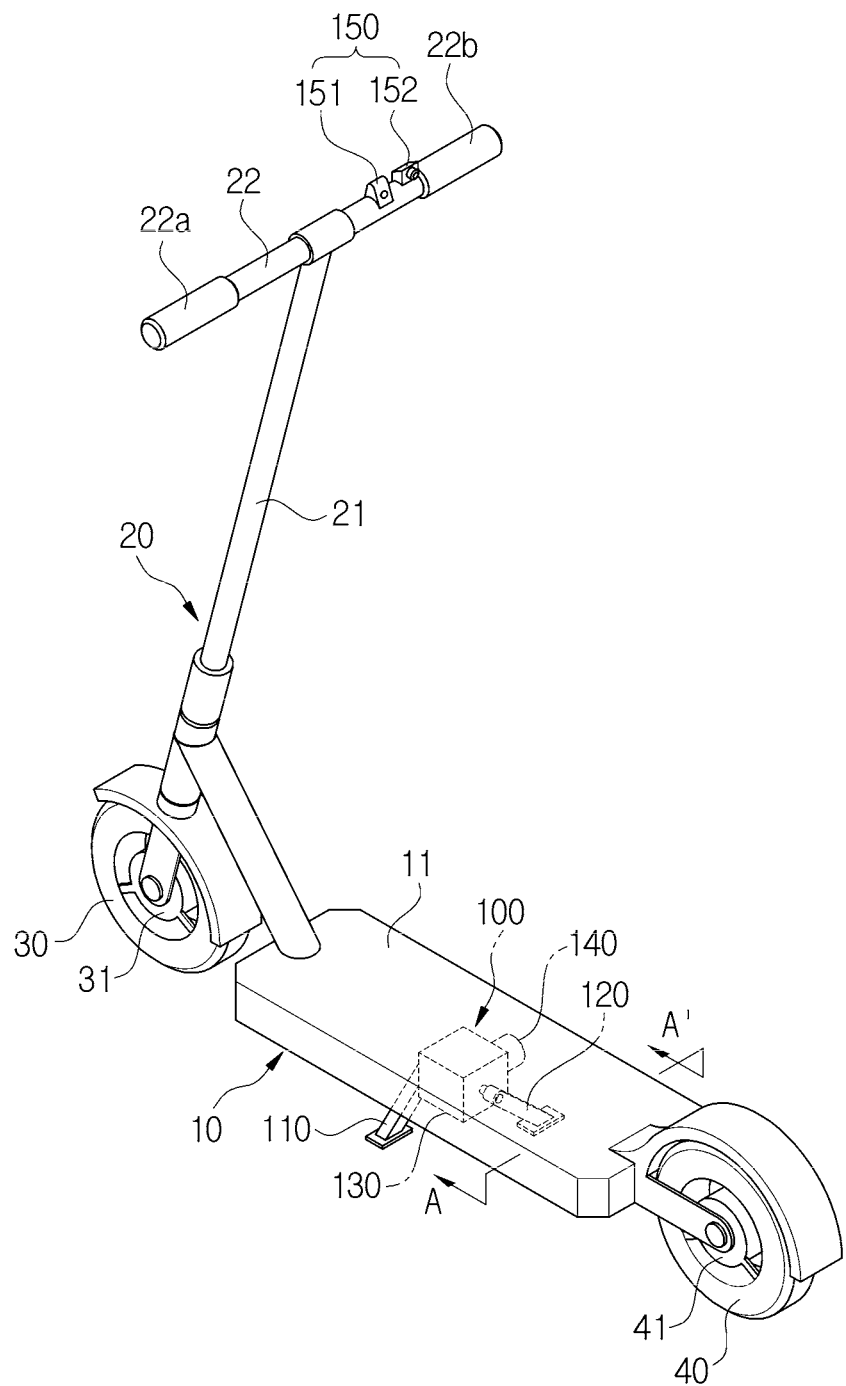
FIG. 1 is a perspective view of a personal mobility to which a parking system according to a first embodiment of the disclosure is applied.
Figure 2:
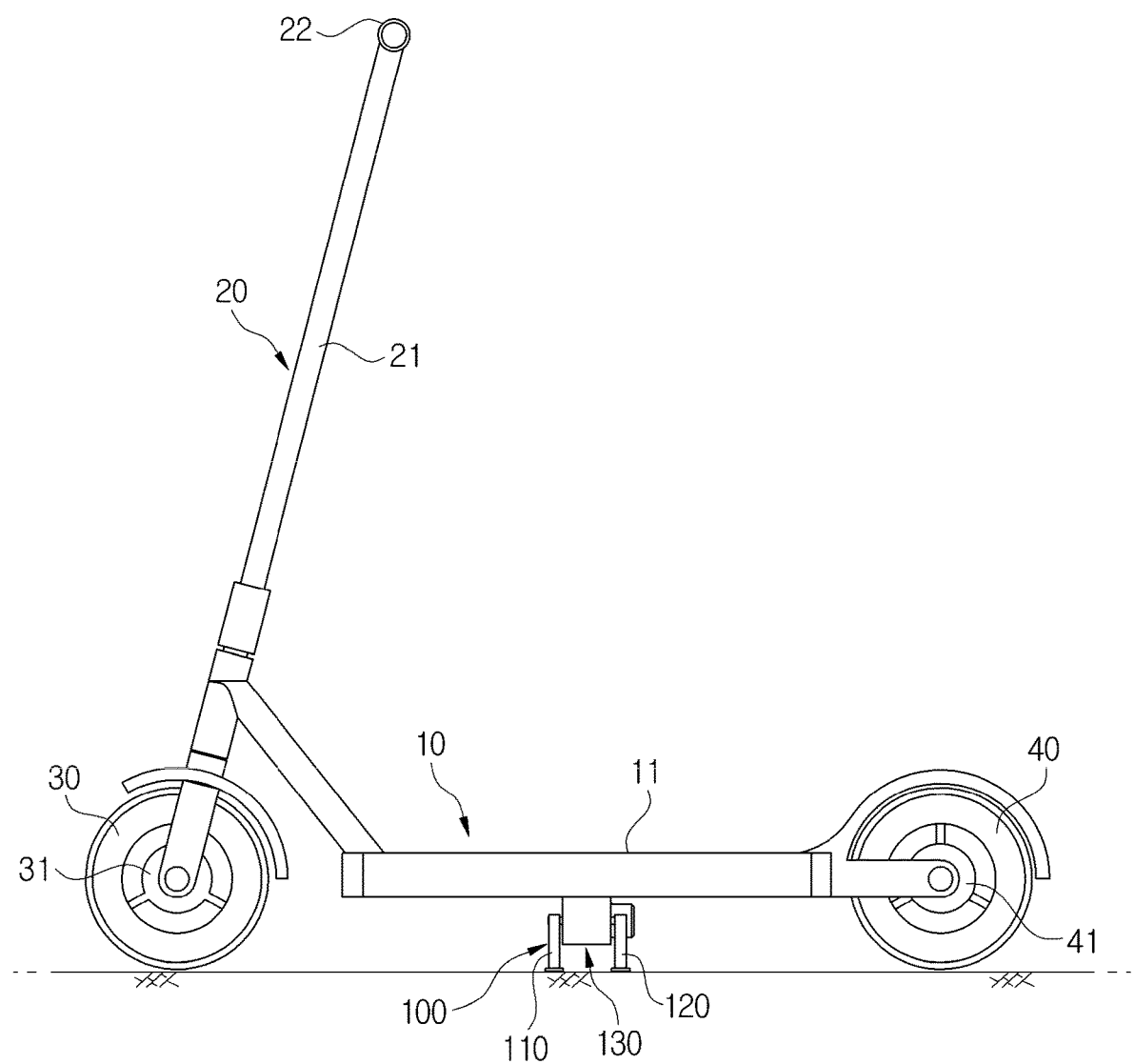
FIG. 2 is a side view of the personal mobility to which the parking system according to the first embodiment of the disclosure is applied.

Referring to FIGS. 1 and 2, a personal mobility to which a parking system 100 according to a first embodiment of the disclosure is applied may include a main body 10 provided with a footrest 11, a steering device 20 provided in front of the main body 10, a front wheel 30 at a lower end of the steering device 20, and a rear wheel 40 installed at a rear end of the main body 10.

The steering device 20 includes a steering shaft 21 rotatably installed at a front end of the main body 10, and a steering handle 22 connected to an upper end of the steering shaft 21 and provided with a left handle 22a and a right handle 22b.

The front wheel 30 and the rear wheel 30 may include drive motors 31 and 41 for driving and braking devices for braking, respectively. The main body 10 may include a battery (not shown) to supply electric power to the driving motors 31 and 41 of the front wheel 30 and the rear wheel 40. At least one of the left handle 22a and the right handle 22b of the steering wheel 22 may include a function to control driving and braking by the manipulation of a user.

Referring to FIGS. 1 to 4, the parking system 100 of the first embodiment may include a first parking stand 110, a second parking stand 120, a power transmission device 130, a parking motor 140, an operation unit 150, and a controller (not shown).

The first parking stand 110 and the second parking stand 120 are configured such that one end thereof is rotatably installed below the main body 10 of the personal mobility. A shaft 111 of the first parking stand 110 and a shaft 121 of the second parking stand 120 are spaced apart from each other in a state in which shaft lines thereof coincide with each other. The shaft lines of the first parking stand 110 and the second parking stand 120 are arranged to direct to a driving direction of the personal mobility so that the first parking stand 110 and the second parking stand 120 may be unfolded by rotating downward from opposite sides, or may be folded by rotating upward from the opposite sides.

The power transmission device 130 may be installed between the first parking stand 110 and the second parking stand 120. The power transmission device 130 transmits a rotational force of the parking motor 140 to the shafts 111 and 121 of the first parking stand 110 and the second parking stand 120 to rotate the first parking stand 110 and the second parking stand 120 in opposite directions at the same time.

Figure 3:
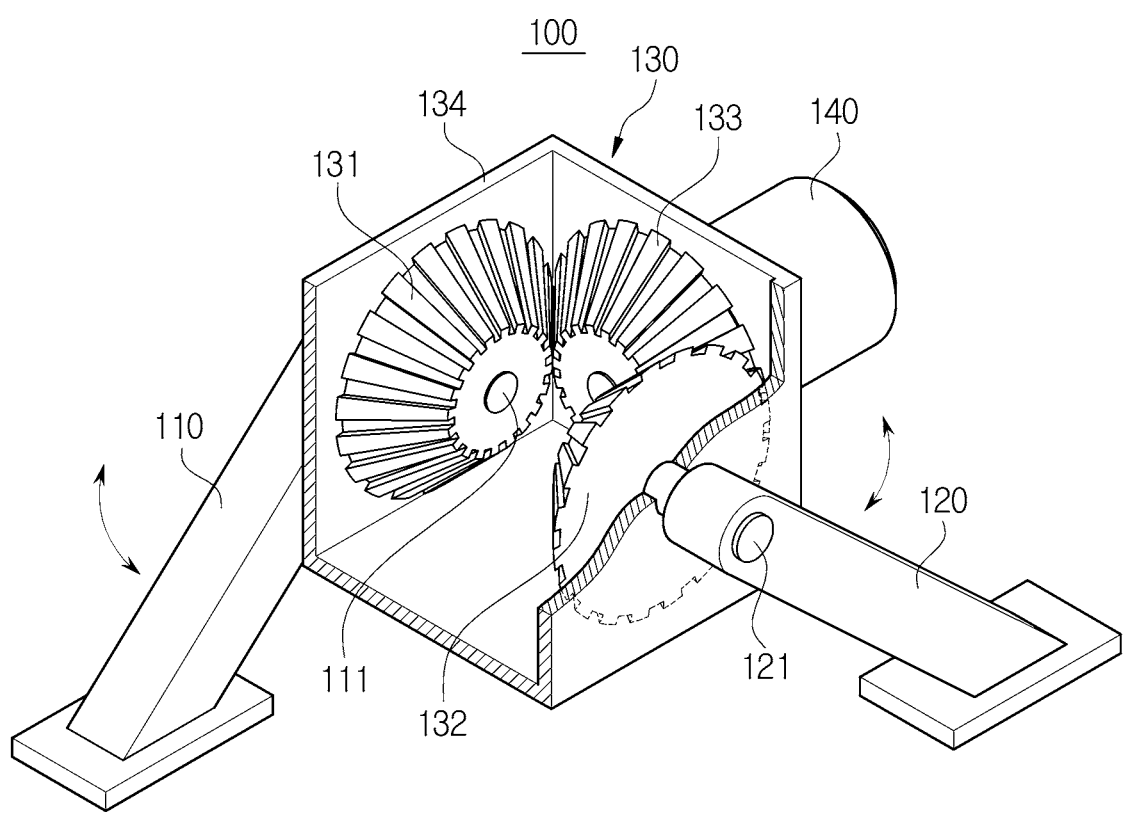
FIG. 3 is a perspective view of the parking system according to the first embodiment of the disclosure.
Figure 4:
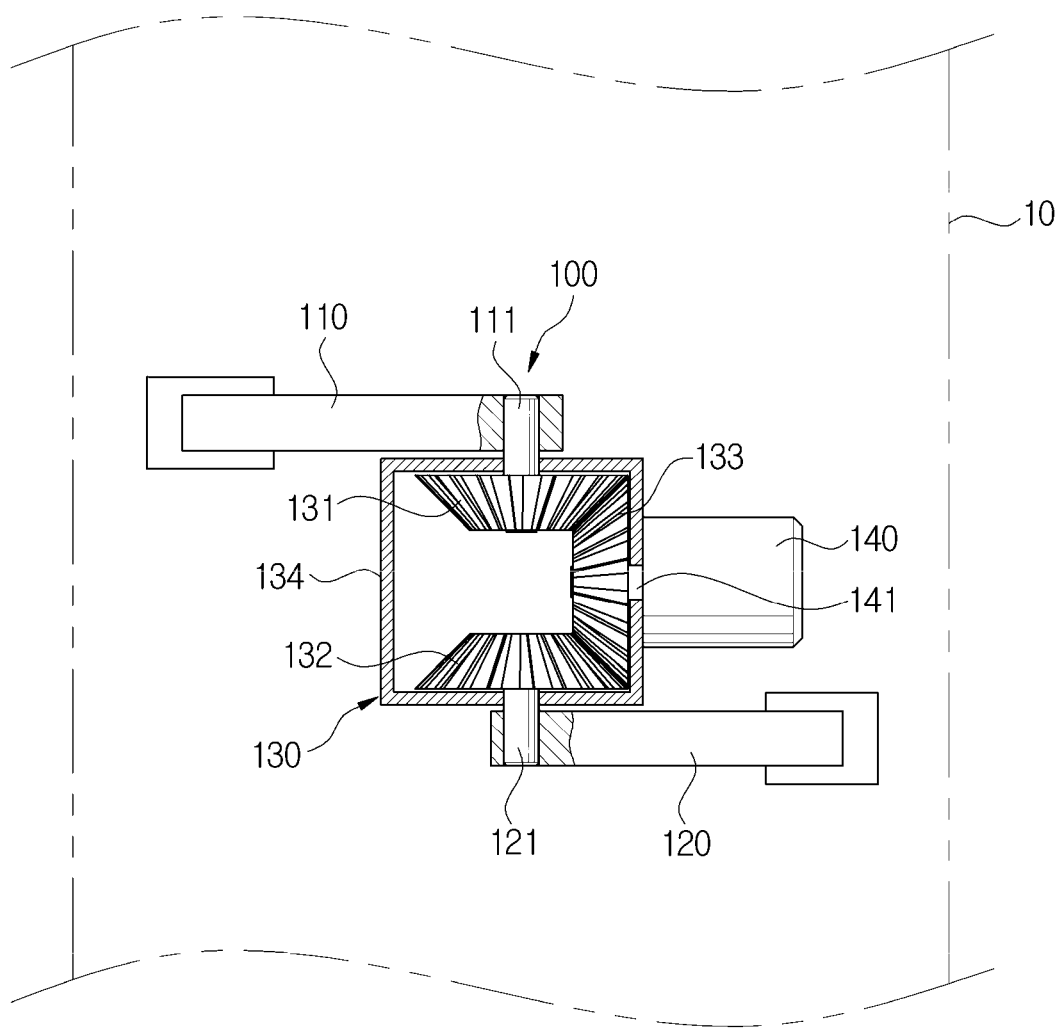
FIG. 4 is a plan view of the parking system according to the first embodiment of the disclosure.

As illustrated in FIGS. 3 and 4, the power transmission device 130 includes a first driven bevel gear 131 coupled to the shaft 111 of the first parking stand 110, a second driven bevel gear 132 coupled to the shaft 121 of the second parking stand 120, and a driving bevel gear 133 disposed between the first driven bevel gear 131 and the second driven bevel gear 132, having opposite sides engaged with the first driven bevel gear 131 and the second driven bevel gear 132, respectively, and coupled to a shaft 141 of the parking motor 140.

The power transmission device 130 includes a gearbox 134 configured to accommodate the first driven bevel gear 131, the second driven bevel gear 132, and the driving bevel gear 133 in a sealed state and fixed to a lower end of the main body 10. The shaft 111 of the first parking stand 110, the shaft 121 of the second parking stand 120, and the shaft 141 of the parking motor 140 may be rotatably supported on the gearbox 134, and the parking motor 140 may be fixed to an outer surface of the gearbox 134.

The first driven bevel gear 131 and the second driven bevel gear 132 may be spaced apart from each other within the gearbox 134 in a state in which the shaft lines coincide, and the driving bevel gear 133 may be arranged such that the shaft line thereof crosses the shaft lines of the first and second driven bevel gears 131 and 132.

The parking motor 140 may rotate the driving bevel gear 133 in a forward or reverse direction. Because the first driven bevel gear 131 and the second driven bevel gear 132 are engaged with opposite sides of the driving bevel gear 133, the first driven bevel gear 131 and the second driven bevel gear 132 may rotate in opposite directions by the operation of the parking motor 140 to rotate the first and second parking stands 110 and 120 in a direction of being unfolded or folded. The parking motor 140 may be composed of a servo motor, a step motor, or the like that may accurately control a rotation angle and may be provided with a reduction device to rotate the driving bevel gear 133 with a large force.

As illustrated in FIG. 1, the operation unit 150 may be provided on the steering handle 22 so that the user may easily manipulate the operation of the parking system 100. The operation unit 150 may include a first operation part 151 to command unfolding and folding operations of the first and second parking stands 110 and 120, and a second operation part 152 to select an unfolding degree of the first and second parking stands 110 and 120.

Figure 5:
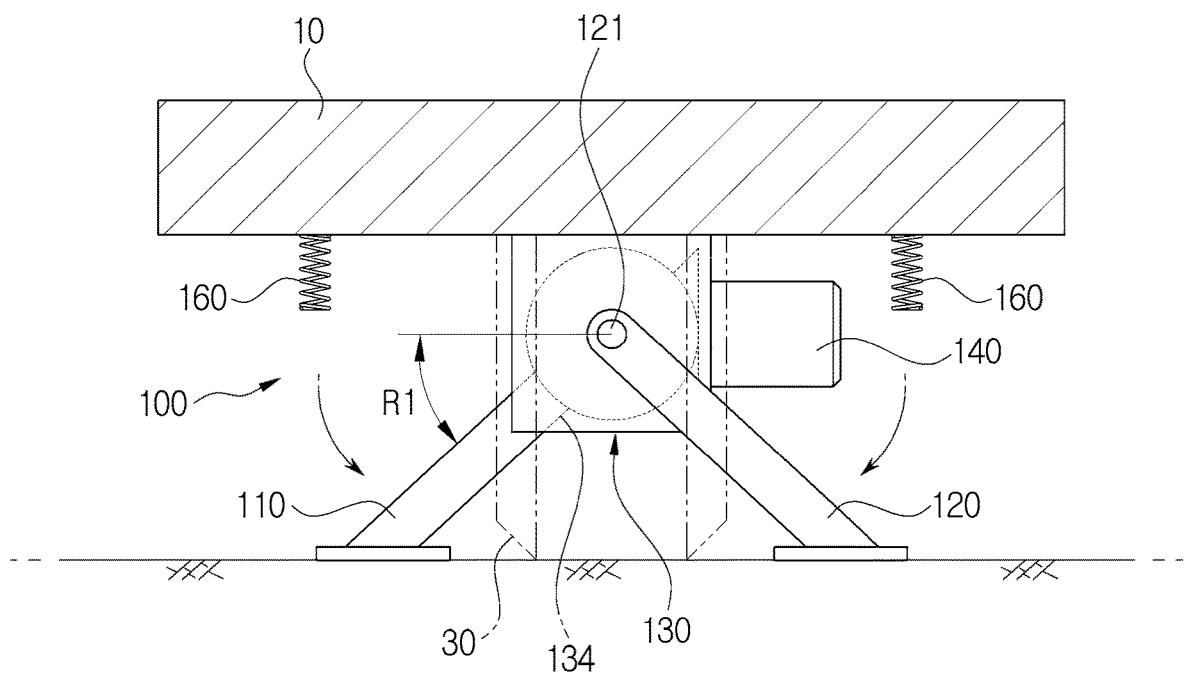
FIG. 5 is a cross-sectional view taken along line A-A' in FIG. 1, illustrating a state in which first and second parking stands are unfolded.
Figure 7:
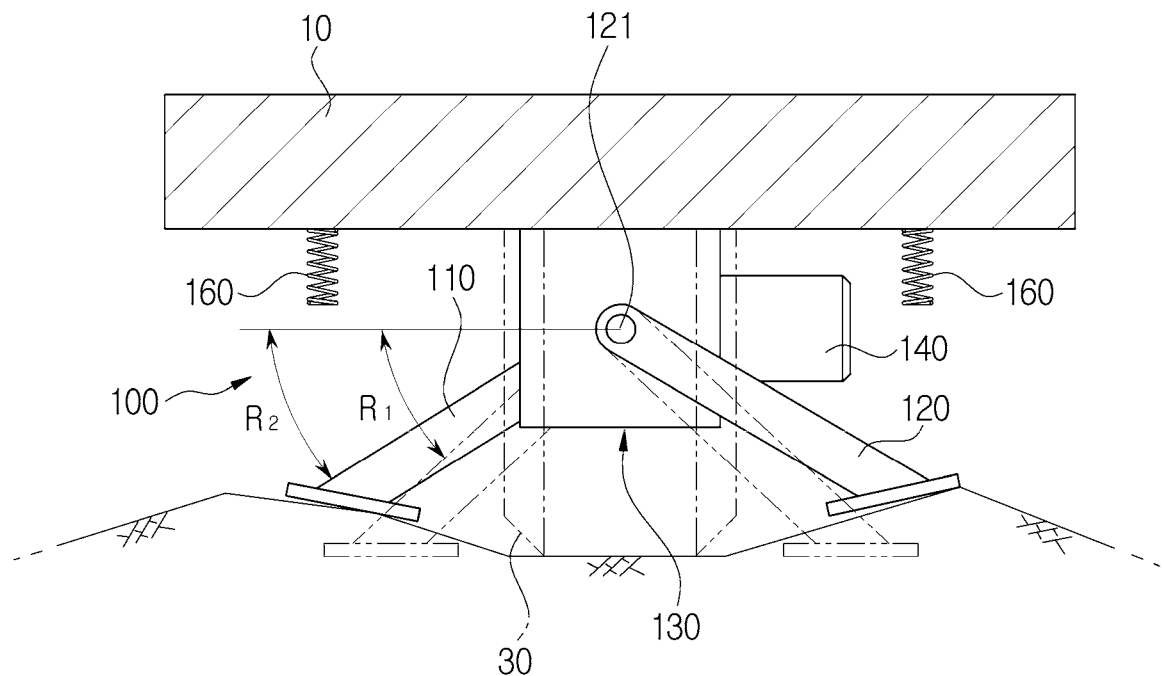
FIG. 7 is a cross-sectional view taken along line A-A' in FIG. 1, illustrating a state in which the first and second parking stands are unfolded on an irregular road surface.

The second operation part 152 may be selected to unfold the first and second parking stands 110 and 120 at a first unfolding angle R1 when a surface of a parking place is flat as illustrated in FIG. 5, or may be selected to unfold the first and second parking stands 110 and 120 at a second unfolding angle R2 smaller than the first unfolding angle R1 when a surface of a parking place is irregular as illustrated in FIG. 7. The second operation part 152 may be set to maintain a state of being selected in advance at any one of the unfolding angles. Therefore, the second operation part 152 may not be operated every time the user commands the operation of the parking system 100, and may be selectively operated by the user as necessary.

The first embodiment illustrates that the operation unit 150 is configured to be separated into a first operation part 151 and a second operation part 152, but the operation unit 150 may be configured as a single touch-type display panel including functions of the first operation part 151 and the second operation part 152. Such a touch-type display may also have a function of displaying various states of the personal mobility.

Although not shown in the drawings, the controller may be embedded in the main body 10 of the personal mobility or the like. The controller may control the operation of the parking motor 140 based on a signal from the operation unit 150. The controller may be provided separately or may be provided integrally with a controller of the personal mobility.

The controller may control the operation of the parking motor 140 such that the first and second parking stands 110 and 120 are rotated in the unfolding direction or the folding direction depending on a signal from the first operation part 151. The controller may also control the rotation of the parking motor 140 such that the first and second parking stands 110 and 120 are unfolded at the first unfolding angle R1 or the second unfolding angle R2 depending on selection information of the second operation part 152. Because the parking motor 140 is composed of a servo motor, a step motor, or the like, the parking motor 140 may accurately rotate the first and second parking stands 110 and 120 at the first unfolding angle R1 or the second unfolding angle R2.

As illustrated in FIG. 5, the first parking stand 110 and the second parking stand 120 located on the opposite sides of the main body 10 is rotated downward at the same time by the rotation of the parking motor 140 in one direction, so that the parking system 100 may stably support the main body 10 of the personal mobility. As in the example of FIG. 5, when a surface of a parking place is flat, the first parking stand 110 and the second parking stand 120 may be unfolded at the predetermined first unfolding angle R1 and supported on the surface of the parking place. Therefore, the main body 10 of the personal mobility may be stably supported without being inclined to either side.

Figure 6:
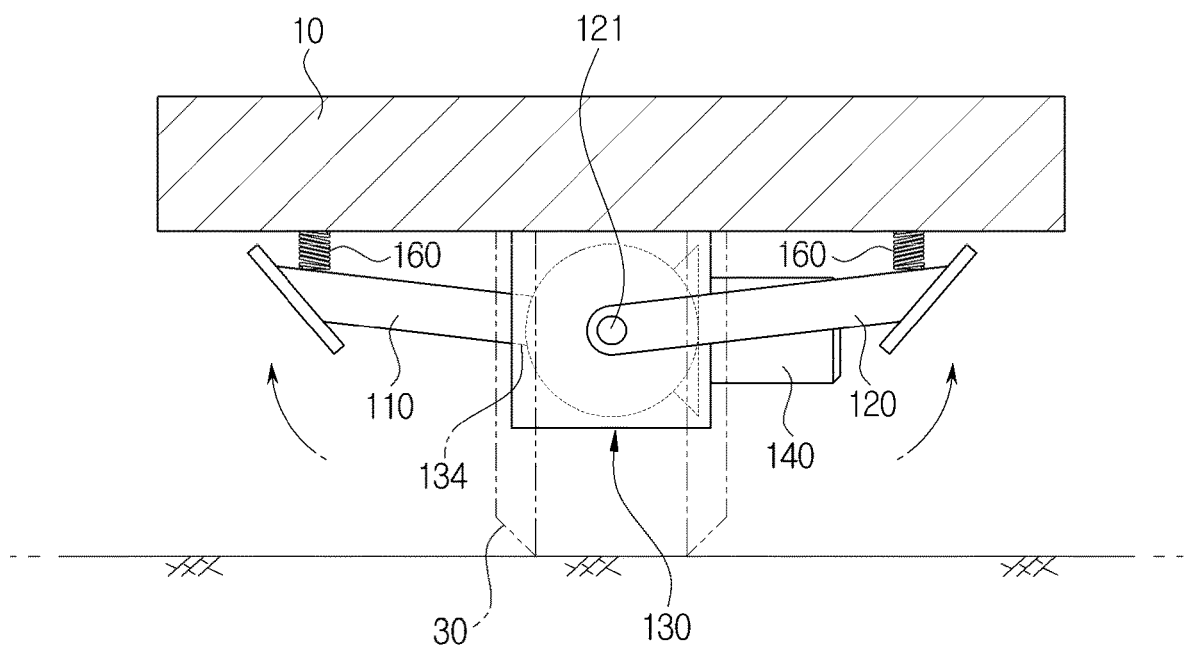
FIG. 6 is a cross-sectional view taken along line A-A' in FIG. 1, illustrating a state in which the first and second parking stands are folded.

When the parking is released, the user operates the first operation part 151, so that the first and second parking stands 110 and 120 may be rotated upward and folded as illustrated in FIG. 6. In this case, the parking motor 140 rotates in reverse so that the first parking stand 110 and the second parking stand 120 are simultaneously raised. Buffer members 160 to support the first and second parking stands 110 and 120 to be buffered during driving while reducing an impact when the first and second parking stands 110 and 120 are raised may be installed on opposite sides of a lower surface of the main body 10.

When the personal mobility is parked on an irregular road surface, as illustrated in FIG. 7, the first and second parking stands 110 and 120 may be unfolded at the second unfolding angle R2 smaller than the first unfolding angle R1 through the manipulation of the second operation part 152. As described above, the parking system 100 according to the first embodiment may enable stable parking by adjusting the unfolding degree of the first and second parking stands 110 and 120 depending on a surface state of a parking place.

Figure 8:
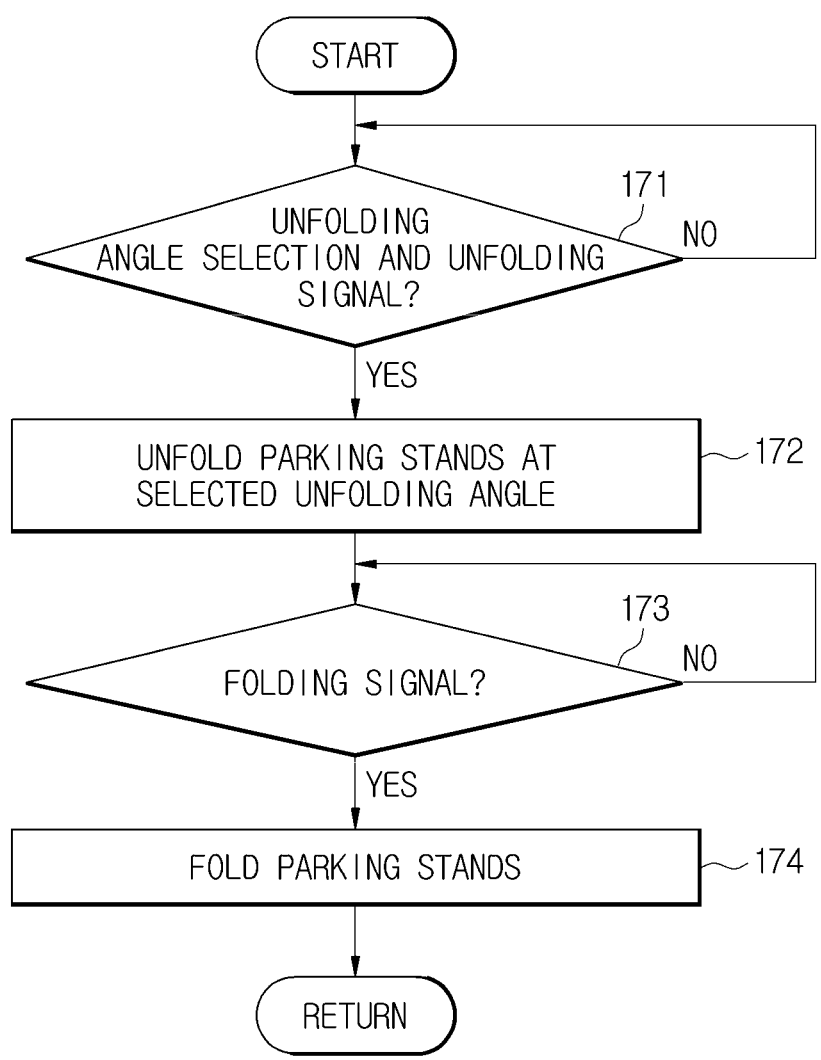
FIG. 8 is a flowchart illustrating a method of controlling the parking of personal mobility to which the parking system according to the first embodiment of the disclosure is applied.

Hereinafter, a parking control method of the personal mobility to which the parking system 100 of the first embodiment is applied will be described with reference to the flowchart of FIG. 8.

When the user intends to park the personal mobility, the user may command the first and second parking stands 110 and 120 to be unfolded by manipulating the operation unit 150. In this case, the controller determines whether an unfolding angle is selected and whether an unfolding signal is generated at 171. The controller controls the operation of the parking motor 140 to unfold the first and second parking stands 110 and 120 at the selected unfolding angle when it is determined that the unfolding angle is selected and the unfolding signal is generated in step 171, at 172.

When the user intends to release the parking of the personal mobility, the user may command the first and second parking stands 110 and 120 to be raised and folded by manipulating the operation unit 150. In this case, the controller determines whether a folding signal is generated at 173, and controls the operation of the parking motor 140 so that the first and second parking stands 110 and 120 are folded when the folding signal is generated at 174.

As such, because the first and second parking stands 110 and 120 are automatically unfolded or folded, the parking system 100 of the personal mobility according to the first embodiment enables convenient use of the personal mobility. In addition, because the first and second parking stands 110 and 120 are simultaneously rotated and unfolded to the opposite sides of the main body 10, the parking system 100 may stably support the main body 10 of the personal mobility.

Because the parking system 100 of the personal mobility of the first embodiment may adjust the unfolding angles of the first and second parking stands 110 and 120 depending on a surface state of a parking place, the parking system 100 may perform stable parking even when the surface of the parking place is irregular.

Figure 9:
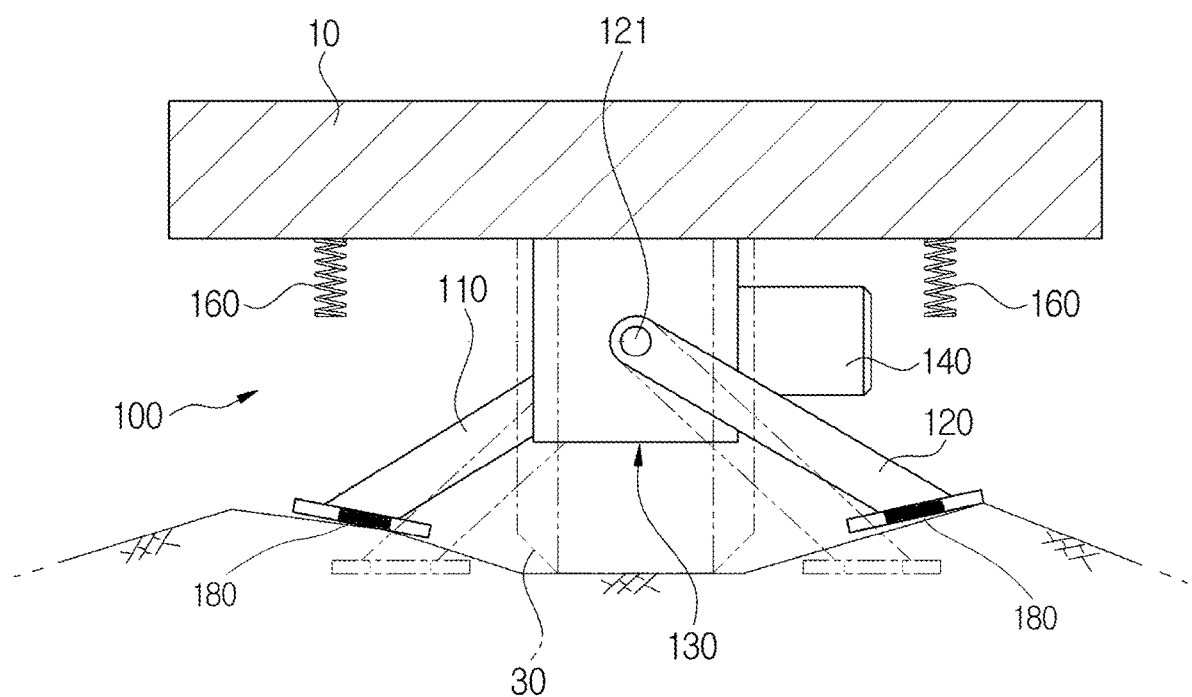
FIG. 9 is a modified example of the parking system according to the first embodiment of the disclosure, illustrating ground contact sensors installed on the first and second parking stands, respectively.

FIG. 9, which is a modified example of the parking system 100 according to the first embodiment, illustrates that the ground contact sensors 180 are installed at lower ends of the first parking stand 110 and the second parking stand 120, respectively, instead of the second operation part 152. The ground contact sensors 180 may detect whether the first or second parking stand 110 or 120 comes into contact with the ground during the unfolding operation of the first and second parking stands 110 and 120.

In the example of FIG. 9, the controller may control the operation of the parking motor 140 based on signals from the first operation part 151 and the ground contact sensors 180. The controller may determine whether an unfolding signal of the first and second parking stands 110 and 120 are generated by the first operation part 151 and may control the parking motor 140 such that the first and second parking stands 110 and 120 are unfolded when the unfolding signal is generated. When the ground contact sensors 180 are detected to come into contact with the ground in the unfolding process of the first and second parking stands 110 and 120, the controller may control the parking motor 140 to stop unfolding of the first and second parking stands 110 and 120. In the example of FIG. 9, because the unfolding angles of the first and second parking stands 110 and 120 are automatically adjusted depending on a surface condition of a parking place, even when the surface of the parking place is irregular, stable parking may be performed.

Figure 10:
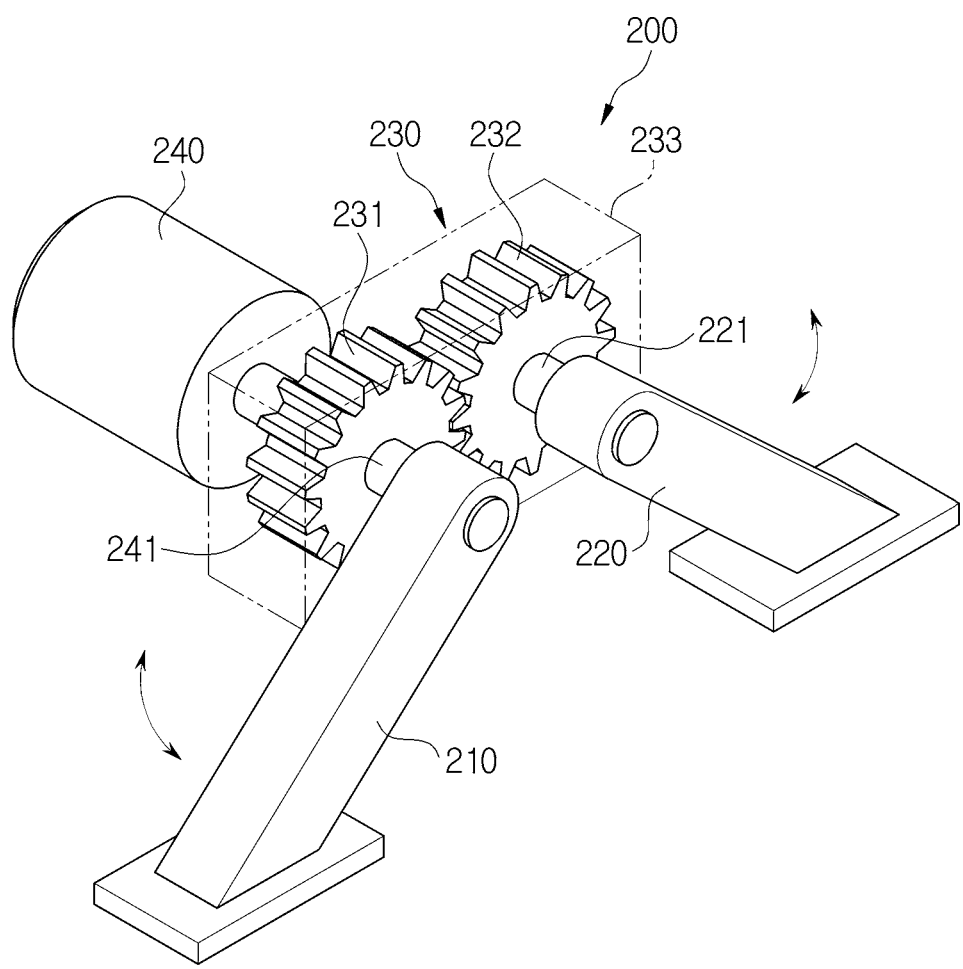
FIG. 10 is a perspective view of a parking system according to a second embodiment of the disclosure.
Figure 11:
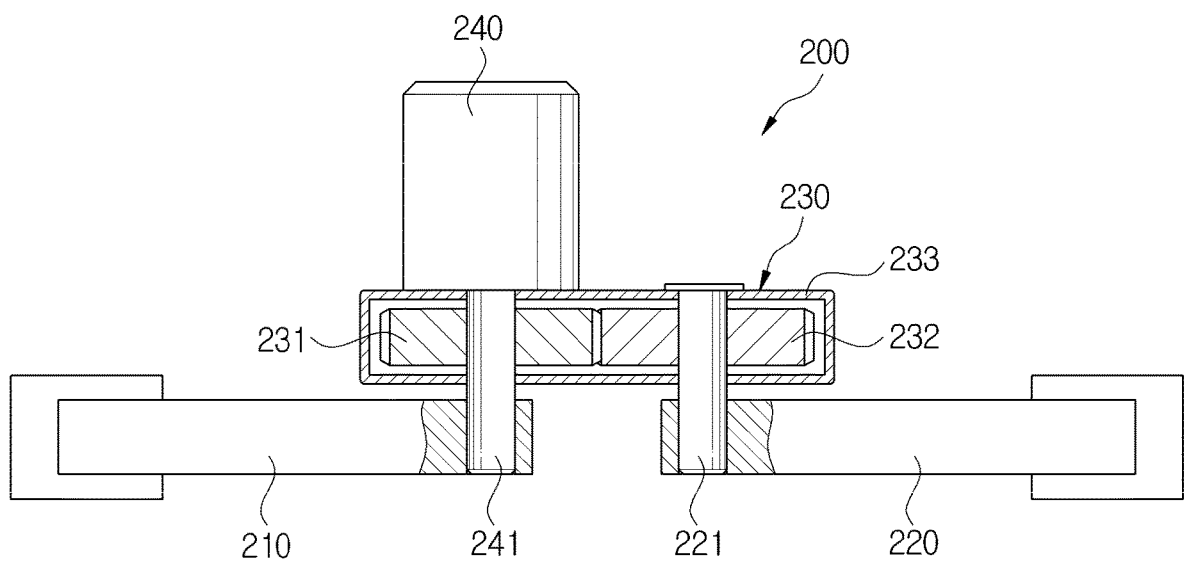
FIG. 11 is a plan view of the parking system according to the second embodiment of the disclosure.

FIGS. 10 and 11 illustrate a parking system 200 according to a second embodiment. The parking system 200 of the second embodiment may include a first parking stand 210, a second parking stand 220, a power transmission device 230, and a parking motor 240.

In the second embodiment, the power transmission device 230 may include a driving gear 231 coupled to a shaft 241 of the parking motor 240 together with the first parking stand 210, a driven gear 232 coupled to a shaft 221 of the second parking stand 220, which is disposed in parallel spaced apart from the shaft 241 of the parking motor 240, and engaged with the driving gear 231, and a gear box 233 provided to accommodate the driving gear 231 and the driven gear 232 and fixed to the lower end of the main body 10.

The shaft 241 of the parking motor 240 and the shaft 221 of the second parking stand 220 may be disposed parallel to the driving direction of the personal mobility. Accordingly, the first parking stand 210 and the second parking stand 220 may be symmetrical on the opposite sides of the lower end of the main body 10.

The parking system 200 of the second embodiment is configured such that the driving gear 231 and the driven gear 232 are rotated in opposite directions by the operation of the parking motor 240. Accordingly, the first parking stand 210 and the second parking stand 220 disposed on the opposite sides of the main body 10 may be simultaneously rotated downward and unfolded to the opposite sides or folded in reverse, as in the first embodiment.

Because the first and second parking stands 210 and 220 are simultaneously rotated and unfolded to the opposite sides, the parking system 200 of the second embodiment may also stably support the main body 10 of the personal mobility.

As is apparent from the above, a parking system of a personal mobility according to an embodiment of the disclosure enables convenient use of the personal mobility because first and second parking stands are automatically unfolded or folded. In addition, the parking system can stably support a main body of the personal mobility because the first and second parking stands are simultaneously rotated and unfolded to opposite sides of the main body.

Further, the parking system of the personal mobility according to an embodiment of the disclosure can perform stable parking even when a surface of a parking place is irregular because the parking system can adjust unfolding angles of the first and second parking stands depending on a surface state of the parking place.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

The invention claimed is:

1. A parking system of a personal mobility vehicle comprising:
   a first parking stand and a second parking stand, each parking stand having one end rotatably installed at a lower end of a main body of the personal mobility vehicle, and each parking stand configured to be rotated downward to be unfolded to opposite sides of the main body or rotated upward to be folded;
   a parking motor configured to operate the first and second parking stands; and
   a power transmission device configured to transmit a rotational force of the parking motor to shafts of the first and second parking stands to simultaneously rotate the first and second parking stands in opposite directions.

2. The parking system according to claim 1, further comprising:
   an operation unit configured to command an unfolding operation and a folding operation of the first and second parking stands; and
   a controller configured to control an operation of the parking motor based on a signal from the operation unit.

3. The parking system according to claim 2, wherein the operation unit is configured to select an unfolding degree of the first and second parking stands.

4. The parking system according to claim 1, further comprising:
   an operation unit configured to command an unfolding operation and a folding operation of the first and second parking stands;
   one or more ground contact sensors configured to detect whether the first or second parking stand comes into contact with the ground; and
   a controller configured to control an operation of the parking motor based on signals from the operation unit and the ground contact sensors.

5. The parking system according to claim 4, wherein the controller controls the parking motor to stop unfolding of the first and second parking stands when it is determined that the ground contact sensors come into contact with the ground.

6. The parking system according to claim 1, wherein the power transmission device comprises:
   a first driven bevel gear coupled to the shaft of the first parking stand;
   a second driven bevel gear coupled to the shaft of the second parking stand; and
   a driving bevel gear having opposite sides engaged with the first and second driven bevel gears, respectively, and coupled to a shaft of the parking motor.

7. The parking system according to claim 6, wherein the power transmission device further comprises a gearbox configured to accommodate the first and second driven bevel gears and the driving bevel gear, and wherein the power transmission device is fixed to the main body.

8. The parking system according to claim 6, wherein the first driven bevel gear and the second driven bevel gear are spaced apart from each other in a state in which shaft lines coincide with each other, and
   the driving bevel gear is arranged such that a shaft line thereof crosses the shaft lines of the first and second driven bevel gears.

9. The parking system according to claim 1, wherein the power transmission device comprises:
 a driving gear coupled to a shaft of the parking motor with the first parking stand; and
 a driven gear coupled to the shaft of the second parking stand arranged parallel to the shaft of the parking motor and engaged with the driving gear.

10. The parking system according to claim 9, wherein the power transmission device further comprises a gearbox configured to accommodate the driving gear and the driven gear, and wherein the power transmission device is fixed to the main body.

11. A parking control method of a personal mobility vehicle, which comprises: one or more parking stands having one end rotatably installed at the personal mobility vehicle and configured to be rotated downward to be unfolded or reversely rotated to be folded; and a parking motor configured to operate the parking stands, the method comprising:
 determining whether an unfolding angle of the parking stands is selected and whether an unfolding signal of the parking stands is generated; and
 controlling the parking stands to be unfolded at the selected unfolding angle when it is determined that the unfolding angle is selected and the unfolding signal is generated;
 wherein the one or more parking stands include a first parking stand and a second parking stand; and
 wherein the parking motor is further configured to simultaneously rotate the first parking stand and the second parking stands in opposite directions.

12. A parking control method of a personal mobility vehicle, which comprises: one or more parking stands having one end rotatably installed at the personal mobility vehicle and configured to be rotated downward to be unfolded or reversely rotated to be folded; a parking motor configured to operate the parking stands; and one or more ground contact sensors configured to detect whether the parking stand comes into contact with the ground, the method comprising:
 determining whether an unfolding signal of the parking stands is generated; and
 controlling the parking stands to be unfolded until the ground contact sensors come into contact with the ground when it is determined that the unfolding signal is generated;
 wherein the one or more parking stands include a first parking stand and a second parking stand; and
 wherein the parking motor is further configured to simultaneously rotate the first parking stand and the second parking stands in opposite directions.

\* \* \* \* \*